United States Patent [19]

Stone

[11] 4,285,573

[45] Aug. 25, 1981

[54] LIGHT REFLECTIVE BICYCLE SAFETY DEVICE AND METHOD OF MAKING THE SAME

[75] Inventor: Richard W. Stone, Minneapolis, Minn.

[73] Assignee: Industrial Design and Engineering, Minneapolis, Minn.

[21] Appl. No.: 784,543

[22] Filed: Apr. 4, 1977

Related U.S. Application Data

[63] Continuation-in-part of Ser. No. 590,935, Jun. 27, 1975, abandoned.

[51] Int. Cl.³ ............................................... G02B 5/12
[52] U.S. Cl. .................................. 350/99; 301/37 SA
[58] Field of Search ............ 301/37 SA, 37 R; 350/6, 350/99–105

[56] References Cited

U.S. PATENT DOCUMENTS

| | | | |
|---|---|---|---|
| 3,357,773 | 12/1967 | Rowland | 350/167 |
| 3,834,765 | 9/1974 | Trimble | 301/37 R |

FOREIGN PATENT DOCUMENTS

| | | | |
|---|---|---|---|
| 595662 | 12/1947 | United Kingdom | 350/106 |

Primary Examiner—John K. Corbin
Assistant Examiner—B. W. de los Reyes
Attorney, Agent, or Firm—John W. Adams

[57] ABSTRACT

This is a corrugated light reflective ring made from thin flexible material and having a light reflective surface on both sides thereof and adapted to be intertwined between the spokes of a bicycle wheel. This invention also embodies the method of making a corrugated light reflective ring.

3 Claims, 8 Drawing Figures

LIGHT REFLECTIVE BICYCLE SAFETY DEVICE AND METHOD OF MAKING THE SAME

This application is a continuation-in-part of my previous patent application Ser. No. 590,935 filed June 27, 1975 now abandoned.

In the past various reflective devices have been used for assisting motorists to see bicycles at night. Such devices include reflective tape adhesively applied to the fenders or tires of the bicycles and also reflective devices which are mechanically attached to the fenders, frame and wheels of a bicycle.

An example of a reflective device used in the prior art for bicycle safety is U.S. Pat. No. 3,834,765. In this Patent, a flexible hollow tubular member is inserted in the spokes of the bicycle wheel. The tubular member has a reflective outer surface.

One important criterion in determining the effectiveness of any reflective device for vehicle safety is the range of angles of incidence for which the reflector will reflect light. The angle of incidence may be defined as the angle (in degrees) from perpendicular with which the light enters or strikes the reflector. The wider the range of angles of incidence over which the reflector will direct light back toward the source of the light, the better the reflector for safety purposes.

Federal requirements for bicycle safety reflectors specify minimum reflectivity for angles of incidence up to 20°. It is highly desirable, however, for safety reflectors to exhibit substantial reflectivity for much larger angles of incidence. Often a car approaches a bicycle from the rear or front rather than from the side. A safety reflector should be effective in these conditions as well as the condition where the car is approaching the bicycle from the side.

It is an object of this invention to provide a light reflective ring having a corrugated configuration to produce maximum light reflectivity in all directions as well as in the direction normal to the bicycle wheel, and adapted to be attached to a bicycle wheel by intertwining the same through the spokes of the wheel substantially adjacent to the rim.

It is another object to provide a method of manufacturing a corrugated light reflective ring for attachment to the wheel of a bicycle and having a radius of curvature conforming to the inner radius of curvature of the rim of the bicycle wheel.

These and other objects and advantages of this invention will be apparent from the following description made in connection with the accompanying drawing wherein like reference characters refer to similar parts throughout the several views, and in which.

Figure 1:
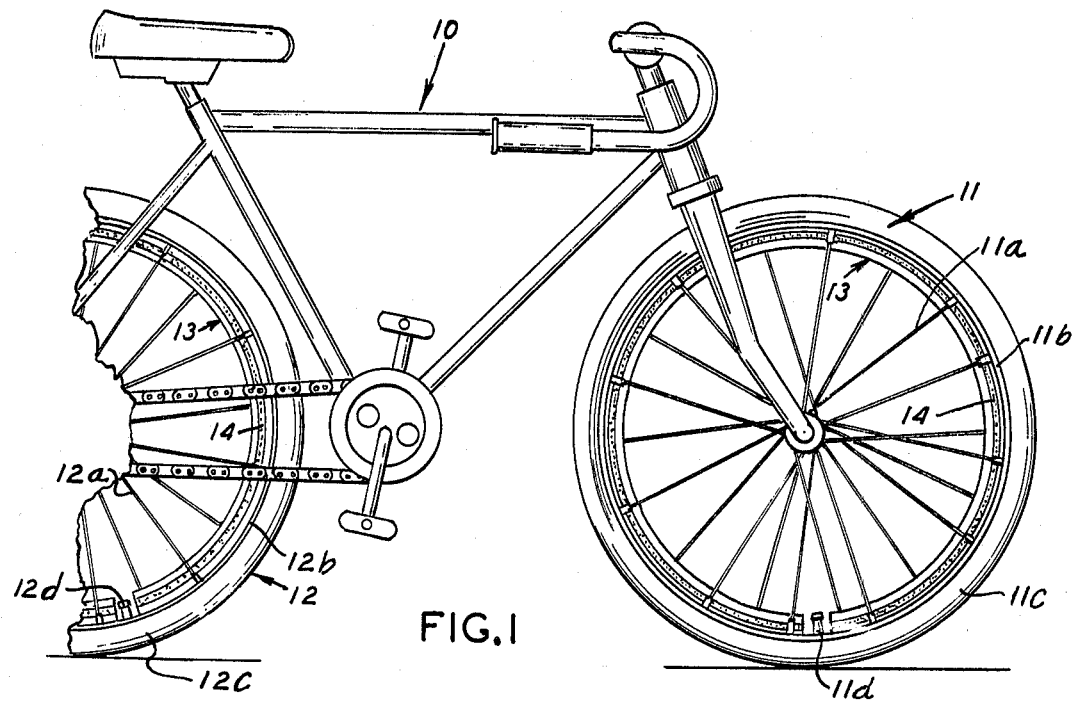
FIG. 1 is a side elevational view of a bicycle showing my light reflective ring mounted on the wheel thereof.
Figures 2, 3, 4:
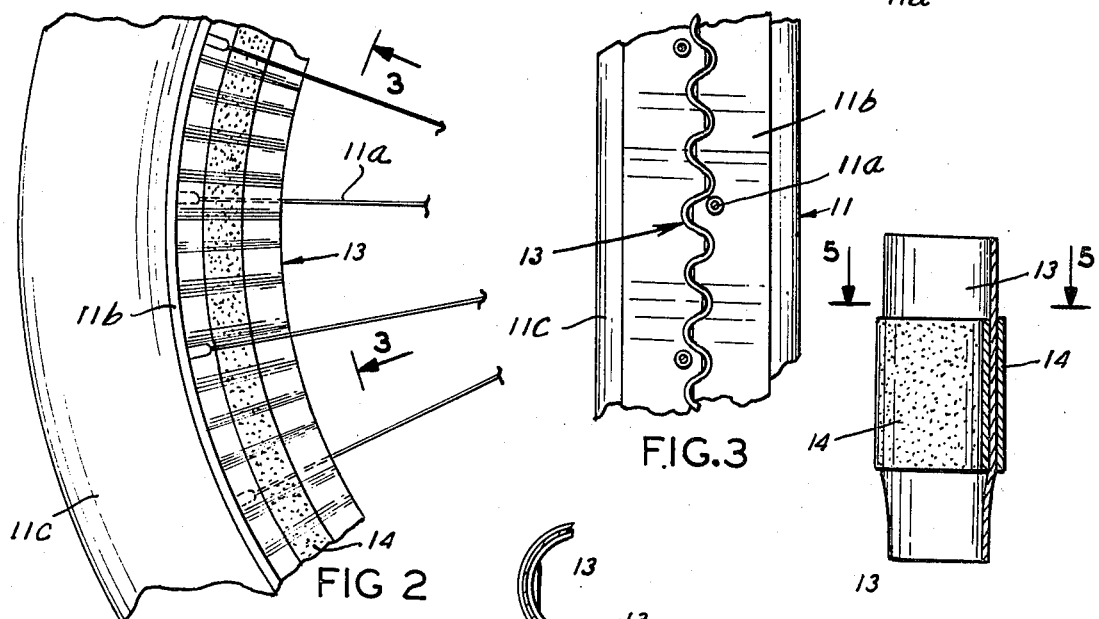
FIG. 2 is an enlarged fragmentary view of a portion of the bicycle wheel illustrated in FIG. 1.
FIG. 3 is a sectional view taken substantially along the curved section line 3—3 of FIG. 2.
FIG. 4 is a fragmentary transverse sectional view taken substantially along the line 4—4 of FIG. 5.
Figures 5, 6:
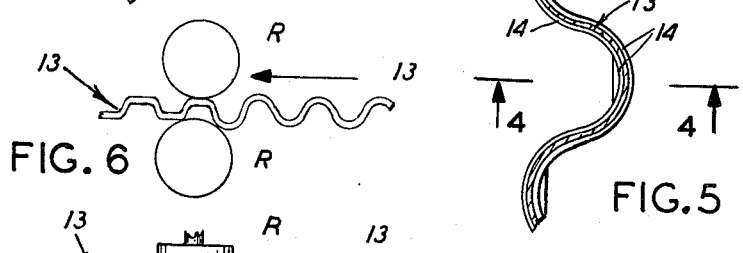
FIG. 5 is fragmentary longitudinal sectional view taken substantially along the line 5—5 of FIG. 4.
FIG. 6 is front elevational view of the compressing rollers used to produce the desired curvature for the reflective ring.
Figure 7:
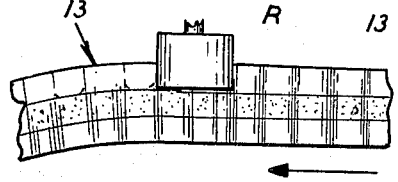
FIG. 7 is a top plan view thereof.

A bicycle 10 is illustrated in FIG. 1 and has a front wheel 11 and a rear wheel 12. Said wheels are provided with spokes respectively designated 11a and 12a and rim portions 11b and 12b. Tires 11c and 12c are also illustrated and have valve stems 11d and 12d.

A corrugated ring of thin sheet material, such as the corrugated aluminum ring 13, is provided and has a light reflective surface applied to both sides thereof as by a strip of reflective tape 14 adhesively attached thereto. Other suitable light reflective surfaces may be used, such as light reflective paint. Light striking said corrugated surface is more fully reflected back along the incident light path than if the reflecting surface were flat, thus giving better warning that a bicycle is being approached.

The method of manufacturing the corrugated reflective ring is set forth as follows:

A flat strip of thin malleable material is initally provided and the reflective tape 14 is applied thereto to both sides thereof. The strip is then corrugated by two mating toothed rollers which provide the corrugation (not shown). The curvature is produced in the corrugated strip by flattening out the corrugations along one marginal edge portion thereof as by a pair of opposed rollers R.

When the corrugations are flattened out along one edge and not the other, the flattened edge will be lengthened and the strip formed into a ring. The extent to which the corrugations are flattened will determine the radius of curvature of the ring 13. The ring is then attached to the outer portion of the wheels 11b and/or 12b, by intertwining the same through the spokes 11a on opposite sides of adjacent spokes.

Figure 8:
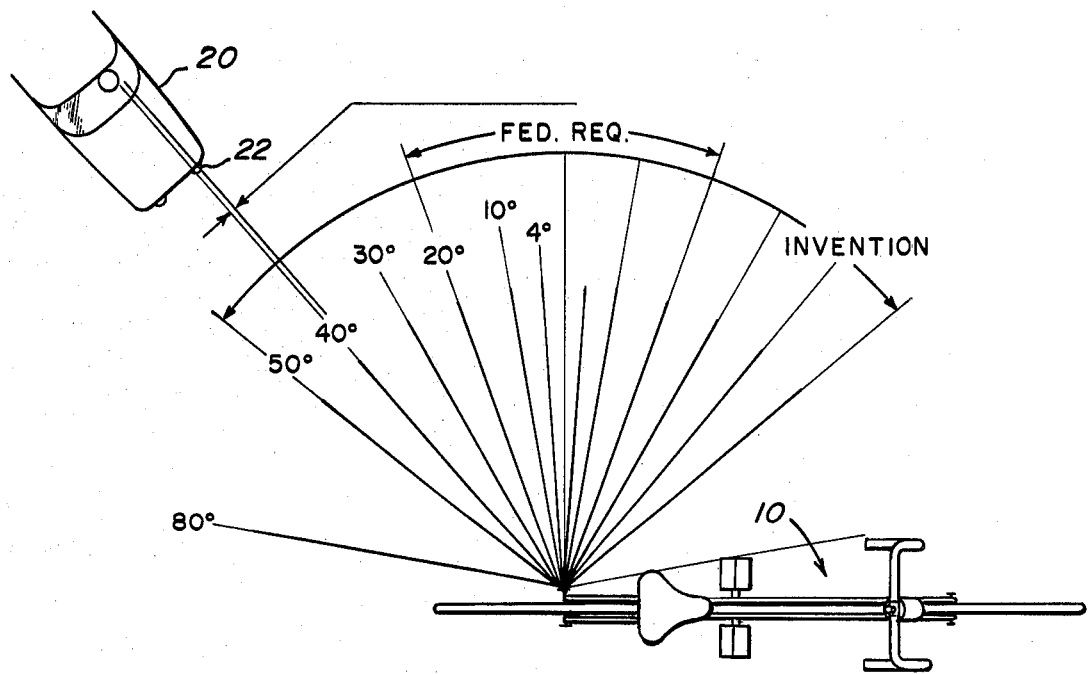
FIG. 8 illustrates the operation of the safety reflector of the present invention.

FIG. 8 illustrates conditions under which the reflector of the present invention must function. An automobile 20 is shown approaching bicycle 10. Light from headlight 22 of automobile 22 strikes the reflector within the spokes of the wheel of bicycle 10. The effectiveness of the reflector as a safety device depends upon its ability to reflect light from headlight 22 back to the driver in automobile 20. The angle of incidence of light is the angle (in degrees) from perpendicular to the tire of bicycle 10. As shown in FIG. 8, there is a divergence angle of about 1.5° between the light source (headlight 22) and the line of sight of the driver.

The reflector of the present invention has been tested to determine its effectiveness as a safety device. Reflection readings were made at several different angles of incidence and on both sides of the bicycle wheel (labeled sides A and B). TABLE 1 lists the test results, as well as the federal requirements for bicycle safety reflectors.

TABLE 1

| | Candle Power Reflectivity | | | | | |
| --- | --- | --- | --- | --- | --- | --- |
| | 4° | 10° | 20° | 30° | 40° | 50° |
| Side A (measured) | 1.19 | 1.72 | .86 | .79 | .60 | .46 |
| Side B (measured) | 1.19 | 1.32 | .93 | .79 | .66 | .46 |
| Federal Requirement | .73 | .63 | .43 | No Requirement | | |

As shown in TABLE 1, the reflector of the present invention far exceeded the federal requirements for angles of incidence up to 20°. In addition, the reflector exhibited substantial reflectivity for angles of incidence much larger than the maximum angle (20°) specified in the federal requirements. The candle power reflectivity at 50° reflector of the present invention is still slightly greater than the federal requirement at 20°. FIG. 8 illustrates the substantial difference between the 20° angle of incidence specified in the federal requirements and the 50° angle of incidence provided by the reflector of present invention.

The tests described above also demonstrated that the reflector of the present invention reflects light even at angles of incidence greater than 80°. Protection is provided, therefore, at angles of incidence up to and beyond 80°.

It will be seen that I have provided an effective light reflecting device for bicycle wheels which can be inexpensively manufactured and quickly and easily attached to a bicycle wheel. Although many types of reflectors for bicycles have been suggested in the past, such as the device shown in the previously mentioned Trimble patent, reflector of the present invention—a corrugated reflective ring inserted between spokes of the wheel—has not been suggested. The demonstrated effectiveness of the present invention over a wide range of angles of incidence, together with the low cost of manufacture, makes the present invention particularly attractive as a reflector for vehicle safety.

It will, of course, be understood that various changes may be made in the form, details, arrangement and proportions of the parts without departing from the scope of this invention as set forth in the appended claims.

What is claimed is:

1. The method of producing a light reflective strip for bicycle wheels comprising,
   providing an elongated strip of relatively thin lightweight malleable material,
   corrugating said strip of material to produce alternate ridges and valleys of substantial depth therein,
   at least partially flattening the corrugations along only one marginal edge portion of the strip to reduce the depth of said ridges and valleys along said one marginal edge portion thereof and thus increase the length of that edge portion as compared with the other marginal edge of said corrugated stip and produce a curved strip wherein the flattened portions form the larger radius of curvature thereof, and
   applying light reflective material to the surfaces of said strip.

2. The method set forth in claim 1 wherein said light reflective material is applied prior to corrugating said strip.

3. The method set forth in claim 1 wherein the flattening of the corrugations along one edge of the strip is produced by providing a pair of closely spaced opposed rollers and moving said edge of the strip through the space between the rollers.

* * * * *